United States Patent [19]

Halvorsen et al.

[11] Patent Number: 4,590,768
[45] Date of Patent: May 27, 1986

[54] FUEL DISTRIBUTION VALVE FLOW TRIMMING AND LOCKING MEANS

[75] Inventors: Robert M. Halvorsen, Birmingham; Jeffrey B. Hurst, Troy, both of

[73] Assignee: Ex-Cell-O Corporation, Troy, Mich.

[21] Appl. No.: 564,268

[22] Filed: Dec. 22, 1983

Related U.S. Application Data

[63] Continuation of Ser. No. 311,361, Oct. 15, 1981, abandoned.

[51] Int. Cl.⁴ ............................................. F02C 7/22
[52] U.S. Cl. ......................................... 60/741; 60/739
[58] Field of Search ...................... 60/739, 740, 741; 251/216, 89, 90, 95; 123/462

[56] References Cited

U.S. PATENT DOCUMENTS

| 1,446,514 | 2/1923 | Norris | 60/741 |
| 2,692,797 | 10/1954 | Wood et al. | 60/741 |
| 4,284,588 | 8/1981 | Hallberg | 123/462 |

Primary Examiner—Louis J. Casaregola
Assistant Examiner—Timothy S. Thorpe
Attorney, Agent, or Firm—Edward J. Timmer

[57] ABSTRACT

A gas turbine engine fuel distribution system includes a fuel distribution valve having a single fuel inlet and a plurality of fuel discharge ports, each of which are connected by an individual fuel manifold to the inlet of an engine fuel injector. The distribution valve has identical fuel metering holes for distributing meter fuel flow to each manifold and injector and an adjustable flow control plug located downstream of the fuel metering holes is accessible during fuel flow through the system to adjust for system inequalities to balance the system during its operation.

14 Claims, 6 Drawing Figures

4,590,768

FUEL DISTRIBUTION VALVE FLOW TRIMMING AND LOCKING MEANS

This application is a continuation, of application Ser. No. 311,361, filed Oct. 15, 1981, now abandoned.

TECHNICAL FIELD

This invention relates to engine fuel systems and more particularly to such systems wherein a multiple outlet fuel distribution valve provides equal fuel flow to each of a plurality of engine fuel injectors.

BACKGROUND OF THE INVENTION

Engine fuel systems are known which include a fuel distribution valve assembly having a single fuel inlet port and multiple fuel discharge ports. An individual fuel manifold conduit separately supplies fuel from each of the discharge ports to a fuel injector assembly such as a fuel nozzle having an inlet port and a spray tip outlet for injecting fuel into the engine combustor whether a variable volume cylinder or a fixed volume chamber.

In order to produce controlled fuel distribution throughout the system, heretofore the fuel flow versus fuel pressure characteristics of each component of the system is determined. Desirably, these characteristics are held within a range so that components of the system can be interchanged by like components without affecting the controlled distribution of system fuel flow. However, each system component and replacement parts for each component have slightly different fuel flow versus fuel pressure characteristics. In order to calibrate the system for interchangeability of injector parts, normal practice has been to place a trimming orifice in the inlet of each fuel injector. This orifice is removable and size adjustable to adjust the fuel flow versus fuel pressure from the inlet of the distribution valve to the spray tip of each nozzle. All of the injectors in the system can be held to close flow limits by use of such trim orifices which can be located in the inlet of the injector.

The same procedure has been used to adjust individual fuel injectors to have closely held flow limits for interchangeability. In such cases the trimming orifice is normally located in the inlet end of the manifold assembly to provide manifolds with like fuel flow versus pressure characteristics.

Because of dimensional variations in the system, each individual fuel manifold can have varying lengths and shape (bends, turns and the like) between its connection to the outlet of the distributor valve and its connection to the inlet of the fuel injector. In such cases it can be impractical to hold all manifolds to the same characteristics. In such cases, manifolds of a given length and shape are held to close flow limits by use of trimming orifices to provide interchangeability of such manifolds without affecting total system distribution.

The fuel distribution valve in such systems desirably has identical fuel metering slots or holes for distributing metered fuel to each system manifold and injector. Such slots or holes are easier to manufacture, however, they require some form of flow adjustment downstream of the metering to adjust for valve inequalities such as internal valve manifolding of variable length, size or shape or like differences in internal valve passages because of manufacturing variations. To accurately test fuel distribution from the distribution valve assembly it is necessary to direct fuel through the complete system or its analog to take into account intersystem cross-leakage.

Fuel flow versus fuel pressure variations within the valve are presently adjusted by use of replaceable trimming orifices like those used in association with each manifold and each nozzle. Adjustment of fuel characteristic variations within the valve is more difficult when total system flow occurs, since adjustments made in one of the internal valve passages with affect distribution through the other internal valve passages. As a result, testing and adjusting of distribution valves is a long, tedious procedure that requires system shut-down and repetitive assembly and trial and error replacement of trimming orifices in the system components before a fuel distribution valve is trimmed for use in a fuel supply system.

SUMMARY OF THE INVENTION

An object of the present invention is to provide an improved, externally adjustable fuel flow versus fuel pressure characteristics flow trimming adjustment means in each of a plurality of passages in a fuel distribution valve for an engine fuel system.

Another object of the present invention is to provide an improved fuel flow versus fuel pressure flow trimming adjustment means in a fuel distribution valve downstream from fuel metering components of the valve which are externally adjustable to produce desired fuel distribution from the valve without removing it from the fuel system or a fuel system analog and without shutdown of total system fuel flow through the valve.

Yet another object of the present invention is to provide an improved flow trimming adjustment means as set forth in either of the preceding objects including means that allow flow versus pressure adjustments to be made in each as of valve passages as fuel flows through the system.

Still another object is to provide an improved flow trimming adjustment means as set forth in any one of the preceding objects and wherein associated locking means are provided to lock the adjustment means in its adjusted position for control of flow versus pressure characteristics in each of the valve passages.

A further object of the present invention is to provide a locking means that is externally removable for external adjustment of the flow trimming adjustement means and which also defines a back-up seal in the flow trimming adjustment means.

The invention, in one embodiment, is associated with a flow distribution valve with a single inlet and a plurality of discharge ports with flow metering means located between the inlet and discharge ports to meter fuel to each discharge port. The valve has a bore formed therein at each discharge port which intersects an internal valve passage located down stream of the metering means. A flow trimming externally threaded plug is adjustably positioned in a threaded portion of the bore. The plug has a nose that is axially positioned within internal flow passage to establish a flow area therethrough for setting a desired fuel flow characteristic versus fuel pressure characteristic therein. The plug has an annular skirt located on the outboard end of the plug with a cone-shaped inner surface which merges with a waist region on the plug. The outside of the waist supports a seal for the bore.

The inside of the waist has a tool receiving socket therein adapted to receive a tool for removing the plug from the bore and for adjusting it axially of the bore for flow area adjustment within the internal valve passage. A wedge shaped lock ring is insertable within the skirt to deform it into sealing engagement with the walls of the bore to define a secondary seal when the flow trimming means is correctly adjusted.

Other features and advantages will be apparent from the specification and claims and the accompanying drawings which illustrate preferred embodiments of the invention.

BRIEF DESCRIPTION OF THE DRAWINGS

Referring now to the drawings, FIG. 1 shows a fuel supply system including a fuel distribution valve 10 having a single inlet 12 adapted to receive fuel from a suitable fuel controller 14. The valve 10 includes a pressure responsive valve element 16 which slides in a liner 18 to control fuel flow through ports or holes 20,22 formed in the valve element 16 and liner 18 by a method more specifically set forth in our co-pending United States Ser. No. 300,719 filed Sept. 10, 1981 for Fuel Distribution Valve. For purposes of simplifying explanation of the present invention, other details of the valve 10 are omitted from the present description. However, reference to the aforesaid application may be had for a complete description of parts and operation of valve 10.

Figure 1:
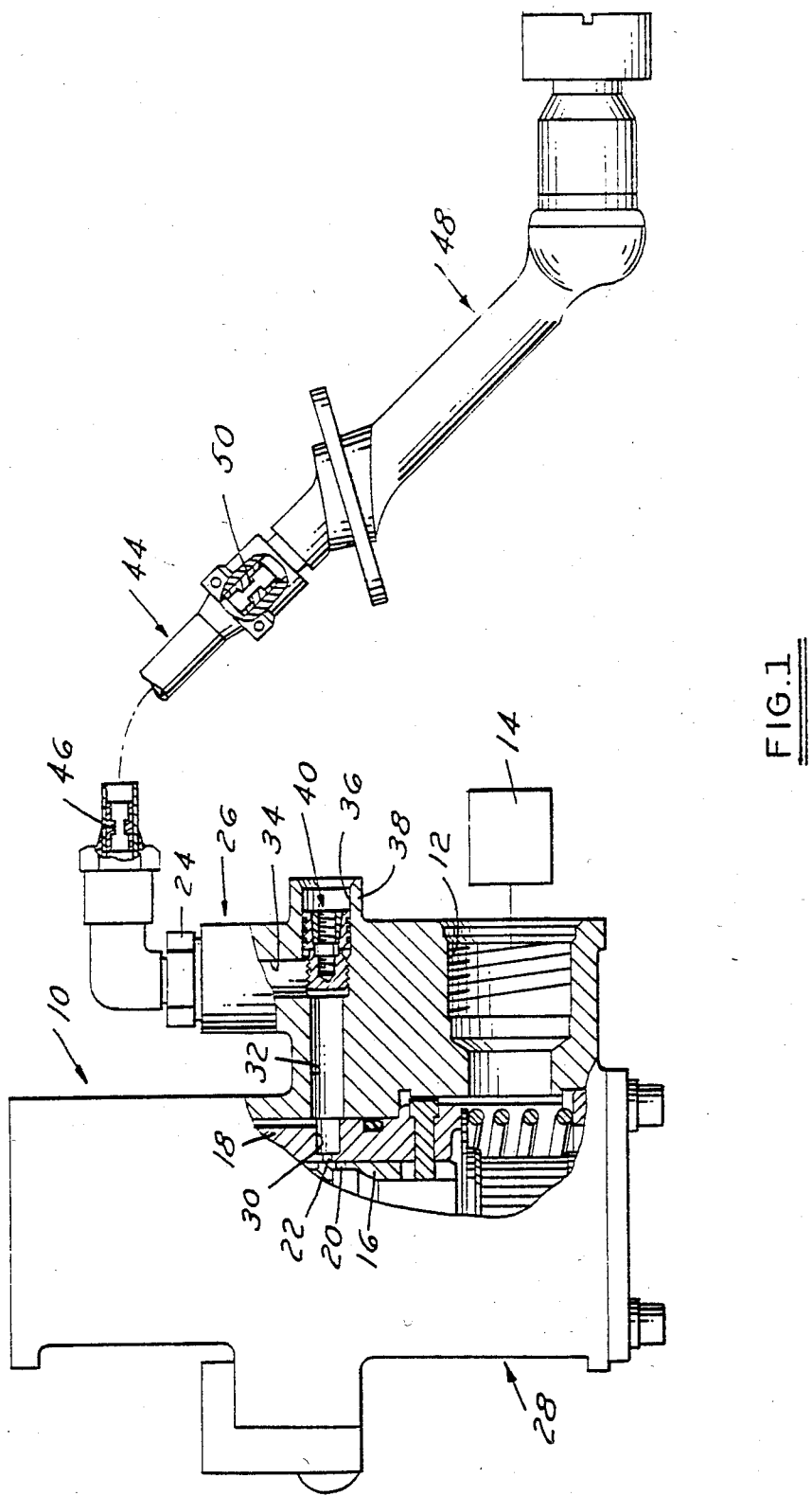
FIG. 1 is a schematic view of a fuel system including the present invention.

Total system fuel flow from the inlet 12 is metered by sliding movement of the valve element 16. Such movement causes overlapping of holes 18,20 to meter and distribute fuel to each of a plurality of discharge ports 24 formed at spaced points around a distribution head 26 formed on the valve body 28.

Fuel flow communication between each of the slots or holes 20,22 and each discharge port 24 is through a lateral passage 30 in liner 18. Distributor head 26 includes a separate passage 32 that is in line with passage 30. The horizontal passage 32 intersects a vertical bore 34 and a side bore 36 in distributor head 26. Side bore 36 extends through the outer surface of body 26 at tubular extensions 38. Several extensions 38 are formed at spaced, peripheral points therearound in line with each discharge port 24.

Each tubular extension 38 houses a flow trimming assembly 40 and lock 42 constructed in accordance with the present invention.

As set forth in the aforesaid preamble, manufacturing variances produce different flow characteristics in passages 20,22,30,32 and discharge ports 24. The flow trimming assembly 40 is located downstream of the metering components in valve 10 and are operative to separately calibrate a plurality of flow paths in the valve while it is connected to downstream components of the fuel supply system. The downstream system includes a plurality of fuel manifolds 44, one is shown in FIG. 1, with a removably adjustable orifice 46 in one end thereof. A fuel manifold 44 connects each of the discharge ports 24 to one end of a fuel nozzle 48. Each nozzle 48 has a removably adjustable orifice 50 at its inlet.

The system components downstream of valve 10 can be pre-adjusted for like flow characteristics. However, once the system is connected together it is recognized that cross-system leakage, head effect and variations in internal flow paths of the valve 10 can produce system inequalities.

Accordingly, the present invention includes improved features in each of the flow trimming assemblies to permit adjustment of fuel flow characteristics versus pressure characteristics of the system downstream of the metering components of the system which are formed by ports or holes 20,22 in valve element 16 and liner 18, respectively.

Figure 2:
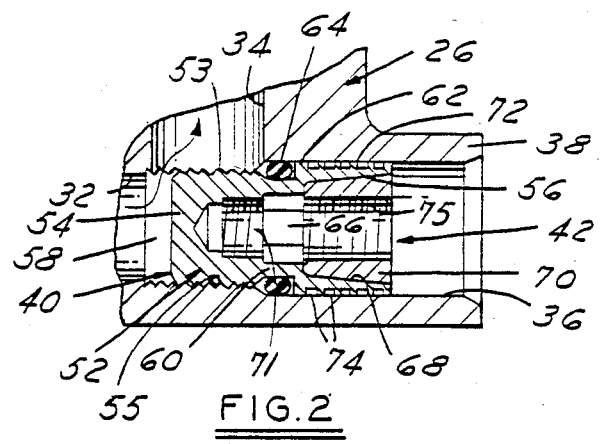
FIG. 2 is an enlarged, fragmentary sectional view of a flow trimming adjustment means in the system of FIG. 1.

More particularly, as best shown in FIG. 2, each of the flow trimming assemblies 40 includes a plug 52 with a threaded O.D. 53 and with an inboard nose 54 at one end and a skirt 56 formed at the opposite end. The plug 52 is axially positioned within a threaded portion 55 of bore 36 as shown in FIG. 2 so that the nose 54 is positioned to block a part of a flow path formed by the intersection 58 between vertical bore 34 and horizontal passage 32 (as viewed in FIG. 2). Threaded adjustment of plug 52 axially of bore 36 will produce a variable adjustment of flow area to trim each flow passage.

The waist 60 of plug 52 includes an external shoulder 62 which receives an O-ring 64 that defines a first seal against leakage from bore 36. A tool socket 66 is formed internally of waist 60 and is accessible from the exterior of the valve 10. The socket 66 receives a tool for threadably positioning the plug 52 axially of bore 36. As the plug 52 is positioned, fuel flow continues and suitable instrumentation (not shown) will indicate when the adjusted flow area through each intersection produces a desired trim of fuel flow characteristics and pressure characteristics. The trim occurs as total system fuel flow passes through the single inlet 12 shown in FIG. 1. As each downstream branch is corrected, changes in each of the remaining branches is observed and any deviation from desired characteristics is readily adjusted by each of the flow trimming assemblies while all of the system components are in place and while the total system fuel flows through the system. Thus adjustment to produce flow characteristics versus pressure characteristics can be made continuously in each flow path and without a long, tedious trial-and-error procedure that requires system shutdown and disassembly and reconnection of components.

Once the system is adjusted to meet desired system distribution requirements, the invention includes a lock 42 defined by a conical inner surface 68 on the outboard end of plug 52 and a wedge type ring 70 with a conically configured outer surface. The ring 70, when inserted in place, as shown in FIG. 2, will produce only a radially directed force on plug 52 which wedges the skirt 56 securely to the wall of bore 36. Interference between skirt 56 and the wall 10 of bore 36 will hold the plug 52 in its adjusted trim position when the ring 70 is seated against inner surface 68 of plug 52. The plug 52 has an internal thread 71 to receive a seating tool for pressing the ring 70 in place to lock the plug 52 in its adjusted position.

After adjustment and locking of plug 52, the ring 70 holds the outer surface 72 of skirt 56 tightly against the wall of bore 36. The outer surface 72 has a plurality of axially spaced, annular grooves 74 therein that define a second seal outboard of O-ring 64. Ring 70 includes a threaded I.D. 75 which has an I.D. diameter greater than the I.D. diameter of thread 71 to permit access of the seating tool. The threaded I.D. is adapted to receive a tool for removing the ring 70 in order to change the adjustment of plug 52.

Figure 3:
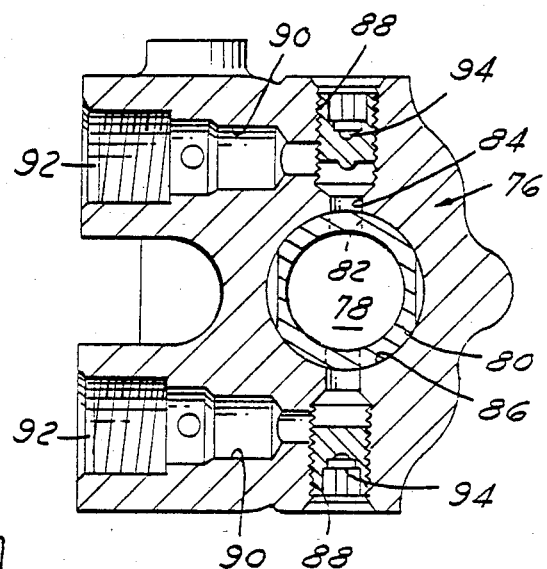
FIG. 3 is a fragmentary sectional view of a flow control valve including another embodiment of a flow trimming adjustment means of the present invention.
Figure 4:
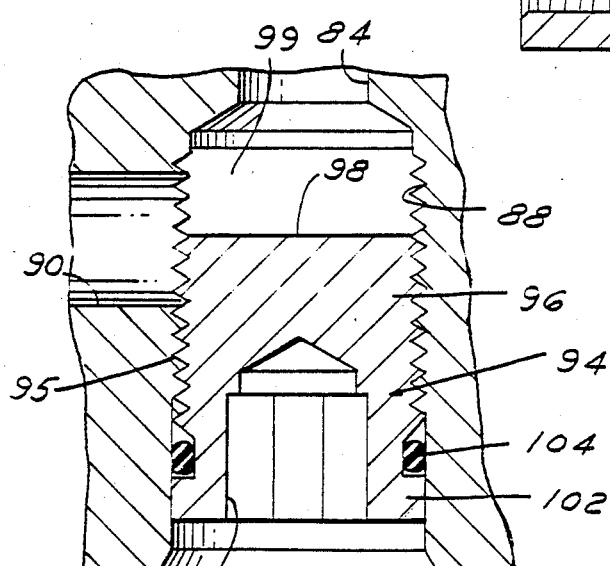
FIG. 4 is an enlarged, sectional view of the flow trimming adjustment means in the valve of FIG. 3.

Another embodiment of the invention is illustrated in FIGS. 3 and 4 wherein a flow distribution valve body 76 is shown. It includes a single inlet passage 78 which communicates with the inside of a valve element 80. Metering ports or holes 82,84 are formed in element 80 and the valve body 76 at a bore 86 therethrough. Operation of the valve is more specifically set forth in above U.S. Ser. No. 300,719 for Fuel Distribution Valve. The ports or holes 82,84 define metering components upstream of and in communication with bores 88 in valve body 76 formed laterally of bore 86 from the outside surface of valve body 76. Each bore 88 intersects a discharge passage 90 leading to a discharge port 92. Each port 92 is connected to downstream fuel manifolds and fuel nozzles of the type described with respect to the embodiments of FIGS. 1 and 2.

In the embodiment of FIGS. 3 and 4, a flow trimming assembly 94 is located in each bore 88. Each assembly 94 includes an externally threaded plug 96 with a nose 98 adjustably positioned at the intersection 99 of passage 90 and bore 88 to adjustably vary the flow area therethrough. An outboard flanged head 102 of plug 96 is press fit in bore 88. Head 102 defines an inboard shoulder against which an O-ring seal 104 abuts to seal the bore 88. A tool socket 106 in the head 102 receives a tool for axially, threadably adjusting the assembly 94 in a threaded portion 95 of bore 88 to establish desired fuel distribution, for example, equal distribution from all discharge ports even though each discharge stream has varying conditions downstream of the discharge port.

Figure 5:
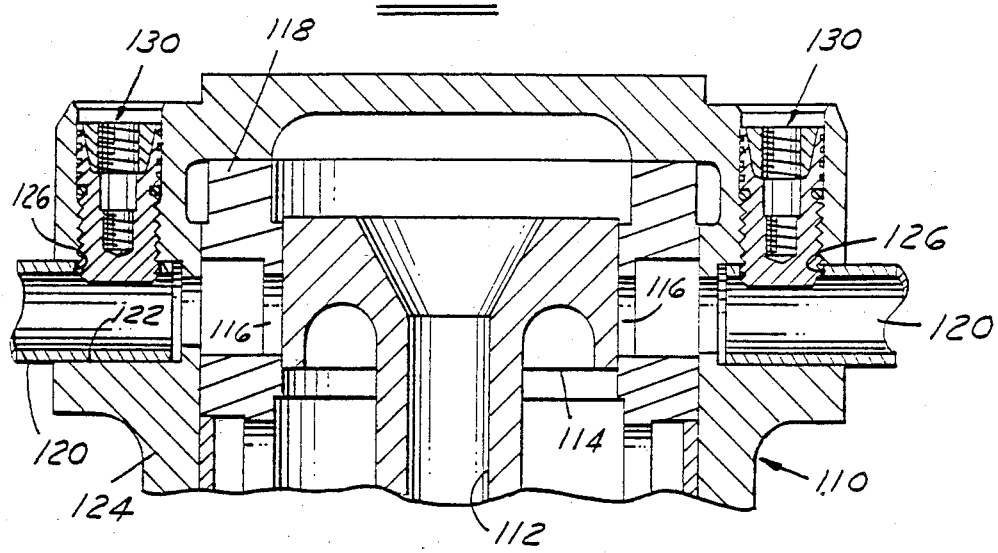
FIG. 5 is a view of a fuel distribution valve with a single metering edge which slides within a liner having a plurality of metering slots or holes and including another embodiment of the present invention.
Figure 6:
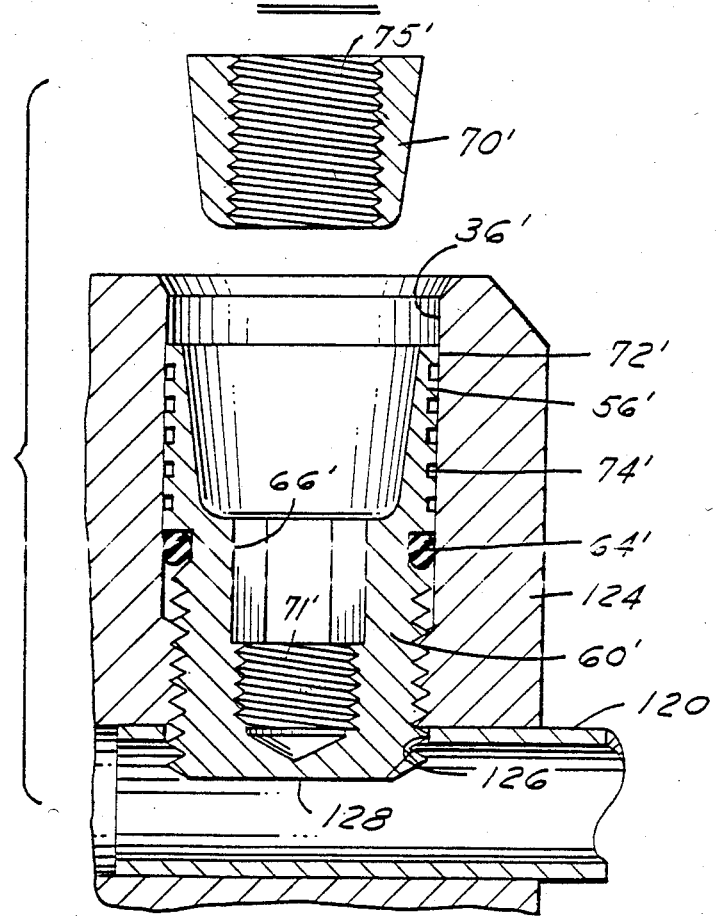
FIG. 6 is an enlarged view of the flow trimming means in the valve of FIG. 5.

The embodiments of FIGS. 5 and 6 show a flow trimming assembly for trimming flow in a conventional, single edge flow distribution valve 110. The valve 110 includes a movable valve element 112 with a single edge 114 that is positioned axially of flow metering holes or ports 116 in a valve liner 118. Each hole 116 communicates with an outlet or discharge tube 120 which fits in a side passage 122 of the valve body 124. Each tube has a side bore 126 through which the nose 128 of a flow trimming assembly 130 extends. Assembly 130, best seen in FIG. 6, includes component parts like those found in assembly 94 in the embodiment of FIGS. 1 and 2 which are referenced in FIG. 6 with like reference numerals primed. In this embodiment the assembly 130 is adjusted and locked in the same manner as described in the embodiment of FIGS. 1 and 2. The adjustment of nose 128 in the straight flow of fuel through tube 120 establishes the adjusted flow area control for adjustment of fuel flow characteristics and fuel pressure characteristics. It should be understood that each tube 120 is connected to downstream fuel manifold and nozzle components as shown in FIG. 1.

In each of the aforesaid embodiments, it should be emphasized that along with compensation of normal system drop variations, the illustrated flow trimming assemblies also compensate for head effects produced by variations of the valve body position with respect to nozzle and manifold positions.

What is claimed is:

1. In a fuel flow distribution system having a distribution valve with a valve body including an inlet and a plurality of discharge ports each connected to the valve by a fuel flow path, each discharge port connected to a manifold and each manifold being connected to a fuel injector, the improvement comprising: a fuel flow characteristic versus fuel pressure flow trim means for trimming fuel characteristics at each discharge port, said flow trim means including means forming a plurality of passages in the valve body each intersecting a respective fuel flow path, a plurality of axially movable plugs each disposed inside a respective one of said passages with each plug including an outboard end accessible from the exterior of the valve during fuel flow through the system without disassembly of the valve to shift the plug inside each passage to an adjusted position during system fuel flow with said outboard end having a locking portion deflectable against the valve body to lock the adjusted position, and means between each said plug and said valve body for sealing said passage, and trim means on each said plug positionable in the respective fuel flow path to each discharge port to independently vary the fuel flow area to each discharge port in accordance with the position of the respective plug within the respective passage whereby the fuel flow characteristics versus fuel pressure characteristics adjustment can be made for each discharge port from the exterior of valve as total system fuel flow passes through the full system without disassembly of its component parts.

2. In the combination of claim 1, said outboard end including said locking portion in the form of a skirt portion and lock means engageable with said skirt portion to force it into engagement with the valve body to lock the plug in an axially adjusted position, said lock means being removable from the exterior of the valve.

3. In the combination of claim 1, said outboard end including a skirt with outer grooves therein, said seal means including an O-ring seal on the outer diameter of said plug and means deflecting said skirt radially outwardly against the walls of said passage to form a secondary seal.

4. In a fuel flow distribution system having a distribution valve with a valve body including an inlet and a plurality of discharge ports each connected to the valve by a fuel flow path, each discharge port connected to a manifold and each manifold being connected to a fuel injector, the improvement comprising: a fuel flow characteristic versus fuel pressure flow trim means for trimming fuel characteristics at each discharge port, said flow trim means including wall means forming a plurality of passages in the valve body each intersecting a respective fuel flow path with each passage having an open passage end opening to the exterior of the valve, a plurality of axially movable plugs each disposed inside a respective one of said passages including an outboard end accessible from the exterior of the valve through said open passage end during fuel flow through the system without disassembly of the valve to shift the plug inside said passage to an adjusted position during system fuel flow with said outboard end having a locking portion deflectable against said well means to lock the adjusted position, and means on each plug movable therewith in sealing engagement with the passage wall means for sealing said passage, and trim means on each plug positionable in the respective fuel flow path to each discharge port to independently vary the fuel flow area to each discharge port in accordance with the position of the respective plug within the respective passage whereby fuel flow characteristics versus fuel pressure characteristics adjustment can be made for each discharge port as total system fuel flow passes through the full system without disassembly of its component parts, said plug having an exteriorly threaded surface thereon, said passage wall means having a portion thereof internally threaded to threadably receive said plug for axially threaded adjustment within the passage to vary the fuel flow area during total system fuel flow.

5. In the combination of claim 4, said outboard each including said locking portion in the form of a skirt portion and lock means engageable with said skirt portion to force it into engagement with the wall means to lock the plug in an axially adjusted position, said lock means being removable from the exterior of the valve.

6. In the combination of claim 4, said outboard end including a skirt with outer grooves therein, said seal means including an O-ring seal on the outer diameter of said plug and means deflecting said skirt radially outwardly against the walls of said passage to form a secondary seal.

7. In the combination of claim 2, said locking means including a wedging member seated against the skirt portion to force it into said engagement.

8. In the combination of claim 7, said plug including means for receiving a seating tool used to seat said wedging member against said skirt.

9. In the combination of claim 8, said wedging member including means for receiving an unseating tool used to remove the wedging member.

10. In the combination of claim 9, said seating tool receiving means and unseating tool receiving means comprising a threaded axial bore in said plug and a large diameter threaded axial bore in said wedging member.

11. In the combination of claim 4, said locking means including a wedging member seated against the skirt portion to force it into said engagement.

12. In the combination of claim 11, said plug including means for receiving a seating tool used to seat said wedging member against said skirt.

13. In the combination of claim 12, said wedging member including means for receiving an unseating tool used to remove the wedging member.

14. In the combination of claim 13, said seating tool receiving means and unseating tool receiving means comprising a threaded axial bore in said plug and a larger diameter threaded axial bore in said wedging member.

* * * * *